US012591255B2

(12) United States Patent
Ryu et al.

(10) Patent No.: US 12,591,255 B2
(45) Date of Patent: Mar. 31, 2026

(54) MOBILE ROBOT AND CONTROL METHOD THEREFOR

(71) Applicant: SAMSUNG ELECTRONICS CO., LTD., Suwon-si (KR)

(72) Inventors: Minwoo Ryu, Suwon-si (KR); Jinhee Kim, Suwon-si (KR); Sangsik Yoon, Suwon-si (KR); Donghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 18/743,576

(22) Filed: Jun. 14, 2024

(65) Prior Publication Data

US 2024/0329660 A1 Oct. 3, 2024

Related U.S. Application Data

(63) Continuation of application No. PCT/KR2022/018436, filed on Nov. 21, 2022.

(30) Foreign Application Priority Data

Jan. 20, 2022 (KR) ........................ 10-2022-0008606

(51) Int. Cl.
G05D 1/648 (2024.01)
(52) U.S. Cl.
CPC ................................... G05D 1/648 (2024.01)
(58) Field of Classification Search
CPC ...... A47L 11/24; A47L 11/283; A47L 11/284; A47L 11/40; A47L 11/4011;
(Continued)

(56) References Cited

U.S. PATENT DOCUMENTS

| 9,436,186 B2 | 9/2016 | Oh et al. |
| 9,474,427 B2 | 10/2016 | Lee et al. |
| (Continued) | | |

FOREIGN PATENT DOCUMENTS

| CN | 107456172 A | 12/2017 |
| JP | 4157731 | 10/2008 |
| (Continued) | | |

OTHER PUBLICATIONS

English Machine Translation of KR-20110085499-A, Accessed Aug. 29, 2025.*

(Continued)

*Primary Examiner* — Jason Holloway
*Assistant Examiner* — Blake A Wood
(74) *Attorney, Agent, or Firm* — STAAS & HALSEY LLP

(57) ABSTRACT

The present disclosure relates to a robot. The robot according to one embodiment of the present disclosure comprises: a memory for storing at least one program; and a processor for executing instructions stored in the at least one program, wherein the processor can divide a travel map into a plurality of cleaning areas on the basis of one or more boundaries, identify, if at least some of the boundaries are identified as a protrusion, the type of protrusion on the basis of the cleaning progress of one area in which the robot is located from among the plurality of cleaning areas, and control in any one of a plurality of travelling patterns on the basis of the identified type of the protrusion.

12 Claims, 15 Drawing Sheets

*100*

*162*  *162*

(58) Field of Classification Search
CPC ............. A47L 11/4038; A47L 11/4066; A47L 11/4069; A47L 2201/04; B25J 9/161; B25J 9/1666; B25J 11/0085; B25J 19/02; G05D 1/2246; G05D 1/241; G05D 1/246; G05D 1/639; G05D 1/648; G05D 1/6482; G05D 2105/10; G05D 2107/40; G05D 2109/10

See application file for complete search history.

(56) References Cited

U.S. PATENT DOCUMENTS

| | | | |
|---|---|---|---|
| 9,480,380 | B2 | 11/2016 | Yoo et al. |
| 9,908,432 | B2 | 3/2018 | Park et al. |
| 10,209,080 | B2 | 2/2019 | Lindhé et al. |
| 10,362,917 | B2 | 7/2019 | Yoo et al. |
| 10,394,249 | B2 | 8/2019 | Kim et al. |
| 11,076,737 | B2 | 8/2021 | He et al. |
| 11,385,655 | B2 | 7/2022 | Jun et al. |
| 11,647,885 | B2 | 5/2023 | Han |
| 11,903,540 | B2 | 2/2024 | He et al. |
| 2005/0015913 | A1* | 1/2005 | Kim ..................... A47L 9/0433<br>15/385 |
| 2005/0171639 | A1* | 8/2005 | Uehigashi ........... G05D 1/0227<br>701/23 |
| 2015/0032259 | A1* | 1/2015 | Kim ........................ G08G 1/16<br>700/255 |
| 2015/0197012 | A1 | 7/2015 | Schnittman et al. |
| 2016/0353959 | A1 | 12/2016 | Lindhé et al. |
| 2017/0071435 | A1* | 3/2017 | Jeong .................. A47L 11/4008 |
| 2017/0080570 | A1 | 3/2017 | Schnittman et al. |
| 2017/0153646 | A1* | 6/2017 | Shin ..................... G06V 10/507 |
| 2018/0255997 | A1 | 9/2018 | So et al. |
| 2018/0348783 | A1* | 12/2018 | Pitzer .................. G05D 1/0214 |
| 2019/0101926 | A1 | 4/2019 | Takaoka et al. |
| 2020/0154966 | A1 | 5/2020 | So et al. |
| 2022/0047141 | A1* | 2/2022 | Xu ...................... A47L 11/4055 |
| 2022/0125263 | A1 | 4/2022 | So et al. |
| 2023/0053480 | A1 | 2/2023 | Lee et al. |

FOREIGN PATENT DOCUMENTS

| | | |
|---|---|---|
| JP | 2017-508196 | 3/2017 |
| JP | 2020-595 | 1/2020 |
| JP | 6750921 | 9/2020 |
| KR | 10-2005-0034145 | 4/2005 |
| KR | 10-2009-0019480 | 2/2009 |
| KR | 10-2010-0104621 | 9/2010 |
| KR | 10-2011-0085499 | 7/2011 |
| KR | 10-1123185 | 3/2012 |
| KR | 10-2015-0107691 | 9/2015 |
| KR | 10-1641242 | 7/2016 |
| KR | 10-2016-0107663 | 9/2016 |
| KR | 10-2017-0033579 | 3/2017 |
| KR | 10-2019-0119222 | 10/2019 |
| KR | 10-2072387 | 2/2020 |
| KR | 10-2020-0069103 | 6/2020 |
| KR | 10-2021-0028426 | 3/2021 |
| KR | 10-2280210 | 7/2021 |
| KR | 10-2021-0100518 | 8/2021 |
| KR | 10-2296693 | 8/2021 |
| KR | 10-2021-0123932 | 10/2021 |
| KR | 10-2492947 | 1/2023 |
| KR | 10-2527645 | 5/2023 |
| WO | WO 2007/008148 A1 | 1/2007 |
| WO | WO 2019/109229 A1 | 6/2019 |

OTHER PUBLICATIONS

English Machine translation of KR-101123185-B1, Accessed Aug. 29, 2025.*

Extended European Search Report dated Feb. 19, 2025, in European Application No. 22922339.1.

International Search Report, PCT/ISA/210, dated Feb. 23, 2023, in PCT Application No. PCT/KR2022/018436.

Written Opinion, PCT/ISA/237, dated Feb. 23, 2023, in PCT Application No. PCT/KR2022/018436.

* cited by examiner

FIG.4

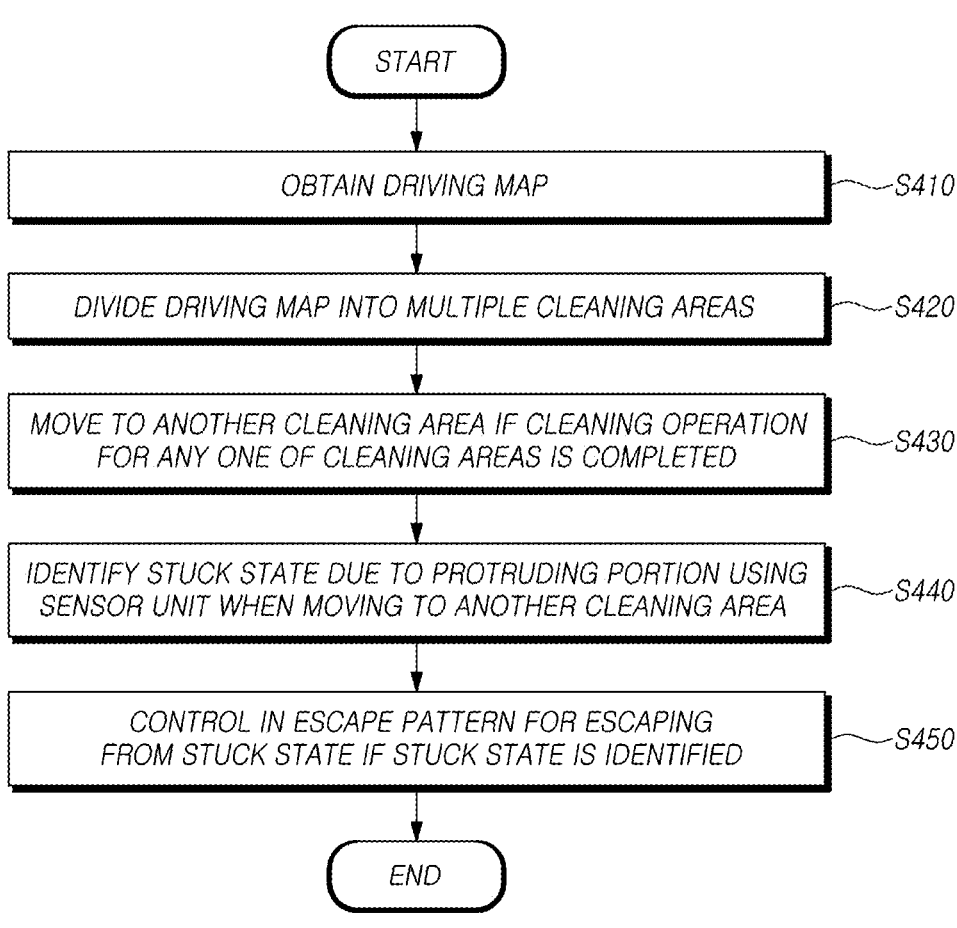

START

OBTAIN DRIVING MAP — S410

DIVIDE DRIVING MAP INTO MULTIPLE CLEANING AREAS — S420

MOVE TO ANOTHER CLEANING AREA IF CLEANING OPERATION FOR ANY ONE OF CLEANING AREAS IS COMPLETED — S430

IDENTIFY STUCK STATE DUE TO PROTRUDING PORTION USING SENSOR UNIT WHEN MOVING TO ANOTHER CLEANING AREA — S440

CONTROL IN ESCAPE PATTERN FOR ESCAPING FROM STUCK STATE IF STUCK STATE IS IDENTIFIED — S450

END

1

MOBILE ROBOT AND CONTROL METHOD THEREFOR

CROSS-REFERENCE TO RELATED APPLICATIONS

This application is a continuation of International Application No. PCT/KR2022/018436, filed Nov. 21, 2022, and claims foreign priority to Korean Application No. 10-2022-0008606, filed Jan. 20, 2022, the disclosures of which are incorporated herein by reference in their entireties.

TECHNICAL FIELD

The disclosure relates to a mobile robot and a method for controlling the same.

BACKGROUND ART

A mobile robot is an electronic device that travels on wheels and performs certain tasks. Mobile robots may include, e.g., assistant robots, cleaning robots or guide robots. Here, the cleaning robot is an electronic device that travels indoors and removes foreign objects on the floor even without user manipulation. In general, an indoor space is constituted of a plurality of rooms and entrances and exits connecting the rooms. Additionally, doors may be installed at the entrances and exits, and a threshold may be constructed on the floor along with the door. Thresholds are generally formed of a hard material (hard floor material) and protrude from the floor, which may block or impede the movement of the cleaning robot. A dry cleaning robot is a cleaning robot that suctions and removes foreign objects on the floor using a brush, and the brush does not need to be in tight contact with the floor. A wet cleaning robot, which is a cleaning robot that wipes foreign objects on the floor using a spin module with a mopping cloth (or water mopping cloth), however, requires that the mopping cloth be brought in tight contact with the floor by the spin module.

DETAILED DESCRIPTION OF THE INVENTION

Technical Solution

The disclosure provides a mobile robot capable of climbing over a protruding portion formed of a hard floor material, located on a driving path and a method for controlling the same.

A robot according to an embodiment of the disclosure may include a memory storing at least one instruction, and a processor configured to execute the at least one instruction to divide a driving map into a plurality of cleaning areas based on one or more boundaries, based on a boundary of the one or more boundaries being identified as a protruding portion, identify a type of the protruding portion based on a cleaning progress for an area where the robot is located among the plurality of cleaning areas, and perform control to drive the robot with any one of a plurality of driving patterns based on the identified type of the protruding portion.

According to an embodiment of the disclosure, the robot may further include a distance sensor and a bumper sensor. The processor may obtain the driving map using a measurement value by the distance sensor and update the driving map using a measurement value by the bumper sensor.

According to an embodiment of the disclosure, the robot may further include a communication unit and receive the driving map from an external device through the communication unit. The driving map may add or exclude the protruding portion by an application stored in the external device.

According to an embodiment of the disclosure, the plurality of driving patterns may include a first driving pattern for climbing over the protruding portion and a second driving pattern for avoiding the protruding portion, and the processor may be configured to execute the at least one instruction to perform control with the first driving pattern based on the protruding portion being identified as a first type of protruding portion and perform control with the second driving pattern based on the protruding portion being identified as a second type of protruding portion.

According to an embodiment of the disclosure, the robot may further include a bumper sensor configured to detect an obstacle in front of the robot. The processor may be configured to execute the at least one instruction to disregard a sensing signal generated by the bumper sensor when performing control with the first driving pattern.

According to an embodiment of the disclosure, the robot may further include an anti-fall sensor configured to detect a height step. The processor may be configured to execute the at least one instruction to, when performing control with the first driving pattern, decrease a sensitivity of the anti-fall sensor, deactivate the anti-fall sensor, or disregard a sensing signal generated by the anti-fall sensor.

According to an embodiment of the disclosure, the robot may further include a body, and a spin module on a lower side of the body. The spin module may have an attaching portion to which a mop cloth is attachable, on a lower side of the spin module. The processor may be configured to execute the at least one instruction to stop rotating the spin module when performing control with the first driving pattern, and rotate the spin module when performing control with the second driving pattern.

According to an embodiment of the disclosure, the robot may further include a pop-out module connected to the spin module. The processor may be configured to execute the at least one instruction to, when performing control with the first driving pattern and the spin module protrudes outside the body by the pop-out module, move the protruding spin module inside the body.

According to an embodiment of the disclosure, the robot may further include a body, and a vibration module on a lower side of the body. The vibration module may have an attaching portion to which a mop cloth is attachable, on a lower side of the vibration module. The processor may be configured to execute the at least one instruction to stop vibrating the vibration module when performing control with the first driving pattern, and to vibrate the vibration module when performing control with the second driving pattern.

According to an embodiment of the disclosure, the robot may further include a body including an inclined protrusion at a front of the body. The first driving pattern may include climbing over forward of the body.

According to an embodiment of the disclosure, the robot may further include a body including a rear slope structure. The first driving pattern may include climbing over rearward of the body.

According to an embodiment of the disclosure, the processor may be configured to execute the at least one instruction to identify the protruding portion as a first type of protruding portion when the cleaning progress is 100% and identify the protruding portion as a second type of protruding portion when the cleaning progress is less than 100%, and perform control to drive the robot with a first driving pattern when the protruding portion is identified as the first type and perform control with a second driving pattern different from the first driving pattern when the protruding portion is identified as a second type.

According to an embodiment of the disclosure, the robot may further include a sensor which is a distance sensor or a gyro sensor. The processor may be configured to execute the at least one instruction to identify a stuck state due to the protruding portion using the sensor; and when the stuck state is identified, perform control to drive the robot with an escape pattern for escaping from the stuck state.

According to an embodiment of the disclosure, the robot may further include a body, and a spin module on a lower side of the body. The spin module may include a left spin module and a right spin module. The processor may be configured to execute the at least one instruction to, when performing control with the escape pattern, perform control to escape from the stuck state by rotating the left spin module or the right spin module to generate a frictional force which combines any one of a forward movement frictional force and a rear movement frictional force, a left moment frictional force, and a right moment frictional force.

According to an embodiment of the disclosure, the robot may further include a body, and a spin module on a lower side of the body. The spin module may include a left spin module and a right spin module. The sensor may be the gyro sensor, and the processor may be configured to, when performing control with the escape pattern, identify a tilt of the body using the gyro sensor, select a spin module located in a direction in which the body is tilted of the left spin module or the right spin module, and rotate the selected spin module.

According to an embodiment of the disclosure, as a case of performing control with the escape pattern, if failing to escape from the stuck state by rotating the selected spin module, the processor may rotate another spin module.

According to an embodiment of the disclosure, the robot may further include a body, a spin module provided on a lower side of the body, and a pop-out module connected to the spin module. The processor, when performing control with the escape pattern, may protrude the spin module outside the body.

A method for controlling a robot, according to another embodiment of the disclosure, may include dividing a driving map into a plurality of cleaning areas based on one or more boundaries, based on a boundary of the one or more boundaries being identified as a protruding portion, identifying a type of the protruding portion based on a cleaning progress for an area where the robot is located among the plurality of cleaning areas, and performing control to drive the robot with any one of a plurality of driving patterns based on the identified type of the protruding portion.

The robot and control method according to various embodiments of the disclosure may be capable of climbing over a protruding portion of a hard floor material located on a driving path.

Effects achievable in example embodiments of the disclosure are not limited to the above-mentioned effects, but other effects not mentioned may be apparently derived and understood by one of ordinary skill in the art to which example embodiments of the disclosure pertain, from the following description. In other words, unintended effects in practicing embodiments of the disclosure may also be derived by one of ordinary skill in the art from example embodiments of the disclosure.

BRIEF DESCRIPTION OF DRAWINGS

FIGS. 3 and 4 are flowcharts illustrating a control method according to various embodiments of the disclosure;

Figure 1A:
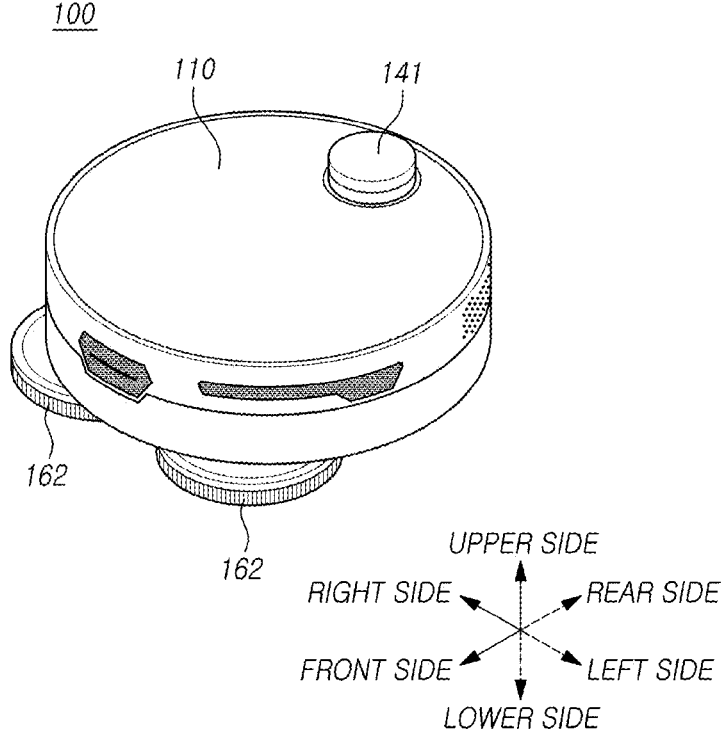
FIG. 1A is a perspective view illustrating a robot according to various embodiments of the disclosure.

Reference may be made to the accompanying drawings in the following description, and specific examples that may be practiced are shown as examples within the drawings. Other examples may be utilized and structural changes may be made without departing from the scope of the various examples.

MODE FOR CARRYING OUT THE INVENTION

Embodiments of the present invention are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

Figure 1B:
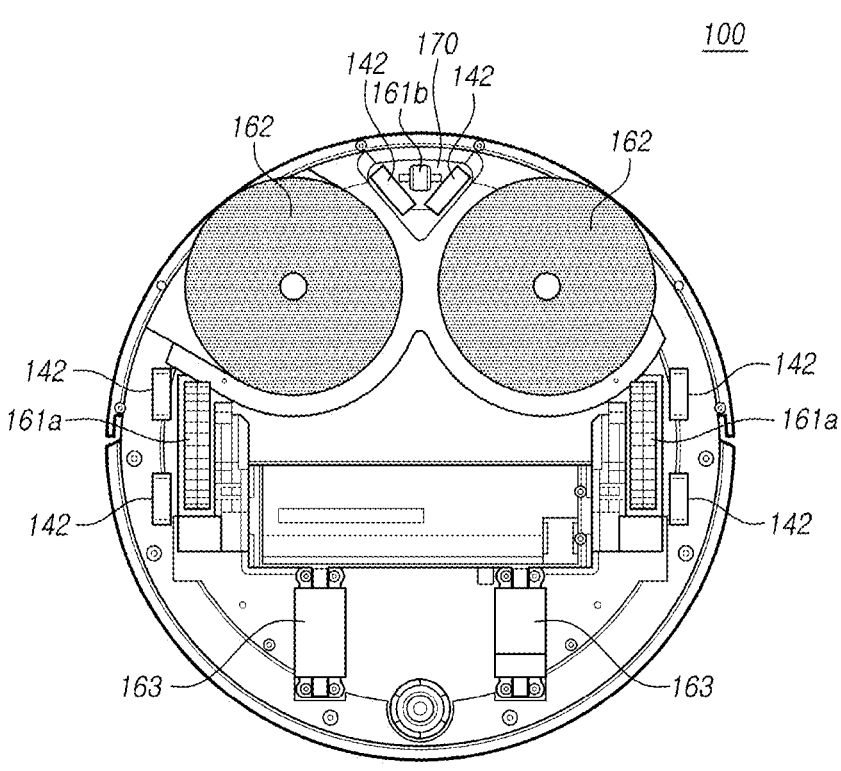
FIG. 1B is a bottom view illustrating a robot according to various embodiments of the disclosure.
Figure 1C:
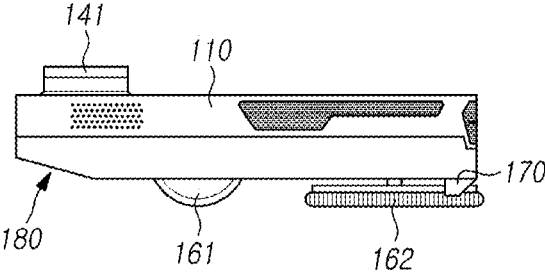
FIG. 1C is a side view illustrating a robot according to various embodiments of the disclosure.

FIG. 1A is a perspective view illustrating a robot according to various embodiments of the disclosure FIG. 1B is a bottom view illustrating a robot according to various embodiments of the disclosure. FIG. 1C is a side view illustrating a robot according to various embodiments of the disclosure.

FIGS. 1A, 1B, and 1C illustrate a robot, e.g., a wet cleaning robot.

Referring to FIGS. 1A, 1B, and 1C, a robot 100 according to various embodiments of the disclosure includes a body 110. The robot 100 includes a wheel module 161a supporting the body 110. The robot 100 includes a spin module 162 supporting the body 110 of the robot 100. The robot 100 is supported by the spin module 162 and the wheel module 161a. The wheel module 161a may include a left wheel module 161a and a right wheel module 161a to horizontally support the robot 100. The spin module 162 may include a left mop cloth and a right mop cloth provided to perform mopping by rotating clockwise or counterclockwise when viewed from above.

According to various embodiments of the disclosure, the spin module 162 is provided to be spaced apart from the floor by a predetermined distance. The spin module 162 is provided to contact the floor by being coupled to the mop cloth. The spin module 162 has an attaching portion for attaching the mop cloth toward the bottom. The attaching portion may be implemented in various structures such as an adhesive pad and Velcro corresponding to the material of the mop cloth. The mop cloth includes various plastic or fiber materials designed for cleaning. As the spin module 162 rotates, the mop cloth rotates together, performing mopping on the floor. The left mop cloth and the right mop cloth are provided to contact the floor. The spin module 162 is disposed below the body 110. The spin module 162 is disposed in front of the wheel module 161*a*. The robot 100 may be provided so that the body 110 is movable by the rotational operation of the spin module 162 without a separate wheel module 161*a*. Here, the term 'mop cloth' in the disclosure may be interchangeably used with the term 'cleaning cloth' or 'spin mob'.

According to various embodiments of the disclosure, the robot 100 may include a vibration module 163. The vibration module 163 is provided to be spaced apart from the floor by a predetermined distance. The vibration module 163 is provided to contact the floor by being coupled to the mop cloth. The vibration module 163 has an attaching portion for attaching a mop cloth toward the floor. The attaching portion may be implemented in various structures such as an adhesive pad and Velcro corresponding to the material of the mop cloth. The mop cloth includes various plastic or fiber materials designed for cleaning. As the vibration module 163 vibrates, the mopping cloth vibrates together, performing mopping on the floor. Meanwhile, unlike the spin module 162, the vibration module 163 may be provided in the rear of the body 110. Further, the mop cloth attached to the vibration module 163 is designed not to block the light emitting path and the light receiving path of the anti-fall sensor 142 provided or to be provided at the rear.

In the disclosure, the mop cloth attached to the spin module 162 provided in front of the body 110 may be referred to as a front mop cloth, and the mop cloth attached to the vibration module 163 provided in the rear of the body 110 may be referred to as a rear mop cloth. In various embodiments of the disclosure, the two or more front mop cloths may have the same shape, but the rear mop cloths may have a different shape from the front mop cloths.

According to various embodiments of the disclosure, the wheel module 161*a* is provided to contact the floor. The wheel module 161*a* is disposed below the body 110. The wheel module 161*a* may be provided to contact the floor at a location spaced forward and backward apart from the left mop cloth and the right mop cloth.

According to various embodiments of the disclosure, the body 110 forms the exterior of the robot 100. A slope structure for supporting climbing over the threshold is formed in the front or rear of the body 110. A front slope structure may be formed in the front of the body 110. A rear slope structure 180 may be formed in the rear of the body 110. Through the front slope structure, the robot 100 may reduce resistance to the threshold and may climb over the threshold through forward driving. Through the rear slope structure 180, the robot 100 may reduce resistance to the threshold and may climb over the threshold through driving in reverse.

According to various embodiments of the disclosure, the front slope structure may include an inclined protrusion 170 provided in front of the body 110. The inclined protrusion 170 extends from the outside to the inside of the body 110 with a predetermined inclination. In front of the inclined protrusion 170, an inclined surface inclined inward of the body 110 may be formed for forward climbing. The inclined protrusion 170 may also have one or more inclined surfaces formed on the rear, right, and left sides. The inclined protrusion 170 may be provided further in front of the body 110 than the spin module 162, and the inclined protrusion 170 may come into contact with the threshold before the spin module 162 during the forward climbing, thereby minimizing the obstruction of the climbing due to the contact between the spin module 162 and the threshold.

According to various embodiments of the disclosure, an auxiliary wheel 161*b* may be provided below the inclined protrusion 170. The auxiliary wheel 161*b* may minimize energy consumed for the forward climbing operation. By minimizing friction between the inclined protrusion 170 and the threshold through the auxiliary wheel 161*b*, the robot 100 may climb over the threshold located in the front with less energy.

According to various embodiments of the disclosure, the rear slope structure 180 includes an inclined surface inclined at a predetermined angle. The inclined surface is formed in the rear of the body 110. For example, at least a portion of the rear side of the body 110 may be formed as an inclined surface forming a predetermined angle with the floor.

According to various embodiments of the disclosure, the robot 100 includes a battery for supplying power. The battery may supply power for a rotational operation of the spin module 162. The battery may supply power for a rotation operation of the wheel module 161*a*.

According to various embodiments of the disclosure, the robot 100 may include an obstacle detection sensor for detecting an obstacle in front. One or more obstacle detection sensors may be provided. The obstacle detection sensor may be disposed on the front surface of the body 110, but is not limited thereto.

According to various embodiments of the disclosure, the robot 100 may include an anti-fall sensor 142 for detecting a height step on a driving path. The anti-fall sensor 142 may be provided on at least one of the front, rear, left, and right sides. The anti-fall sensor 142 may include one or more light emitting elements and one or more light receiving elements. The anti-fall sensor 142 may detect a height step of the floor based on the amount of reflected light output from the light emitting element and reflected from the floor and incident on the light receiving element.

According to various embodiments of the disclosure, the anti-fall sensor 142 may be provided on the left and right sides of the wheel module 161*a*. One or more anti-fall sensors 142 may be disposed on the left side of the left wheel module 161*a*. The anti-fall sensor 142 disposed on the left side may be referred to as a left anti-fall sensor 142. One or more anti-fall sensors 142 may be disposed on the right side of the right wheel module 161*a*. The anti-fall sensor 142 disposed on the right side may be referred to as a right anti-fall sensor 142. In some cases, the anti-fall sensor 142 may be disposed in front of the body 110. When disposed in front of the body 110, the anti-fall sensor 142 may be disposed in front of the spin module 162 to prevent a fall due to a height step in front of the spin module 162. According to various embodiments of the disclosure, the anti-fall sensor 142 may be disposed behind the body 110. The anti-fall sensor 142 disposed at the rear may prevent a fall due to a height step of the robot 100 during the rear driving.

According to various embodiments of the disclosure, the anti-fall sensor 142 may detect the material of the floor. Based on the amount of reflected light, the anti-fall sensor 142 may identify the material of the floor as a hard floor when the amount of light is larger than or equal to a predetermined threshold, and may identify the material of the floor as a soft floor when the amount of light is less than or equal to the predetermined threshold, but is not limited thereto.

According to various embodiments of the disclosure, the robot may include a moisture detection sensor (not shown). The moisture detection sensor (not shown) may be provided on at least one of the front, rear, left, and right sides of the robot, but is not limited thereto. The moisture detection sensor (not shown) may include a capacitive moisture detection sensor (not shown) and a resistive moisture detection sensor (not shown), but is not limited thereto.

According to various embodiments of the disclosure, the robot includes a bumper sensor (not shown) for detecting an external impact. The bumper sensor (not shown) is provided on at least one of the front, left, and right sides of the body. One or more bumper sensors (not shown) are provided. The bumper sensor (not shown) may identify that there is an obstacle in a direction in which the bumper sensor (not shown) is provided when the impact amount is larger than or equal to a predetermined threshold, based on the impact amount generated when the body collides with an external obstacle.

Figure 1D:
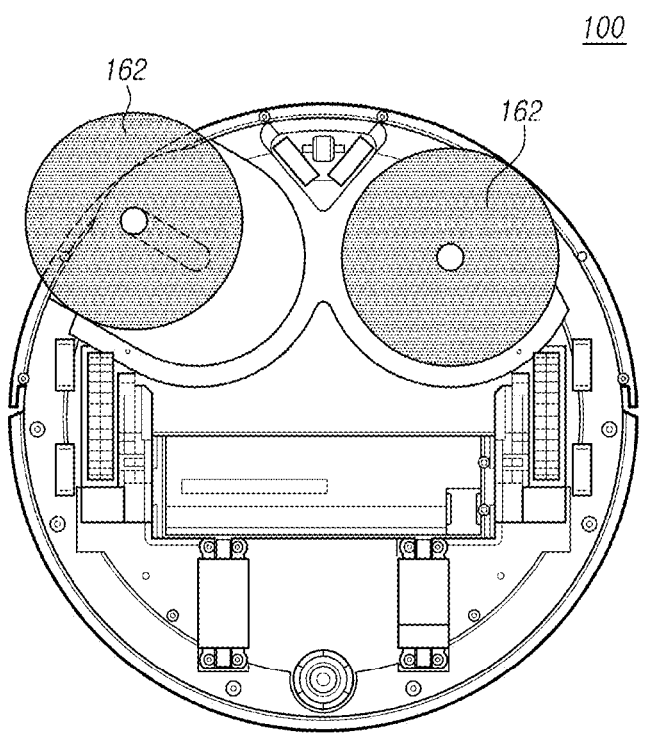
FIG. 1D is a bottom view illustrating a state in which a spin module of a robot protrudes (pop-out state) according to various embodiments of the disclosure.

FIG. 1D is a bottom view illustrating a state in which a spin module of a robot protrudes (pop-out state) according to various embodiments of the disclosure.

The robot 100 according to various embodiments of the disclosure may include one or more spin modules 162 in front of the body 110. Referring to FIG. 1D, in various embodiments of the disclosure, when two or more spin modules 162 are provided, at least some of the spin modules 162 may be configured to pop out of the body 110. At least some of the spin modules 162 may be coupled to a pop-out module (not shown) to be popped out of the body 110. The pop-out module (not shown) includes a connection member having one end connected to at least a portion of the spin module 162, and a guide rail provided on the body 110 to guide the connection member. The connection member is configured to move along a groove (or opening) formed in the guide rail. The spin module 162 connected to one end of the connection member may also move along the guide rail as the connection member moves along the guide rail. The guide rail is formed to extend from the inside of the body 110 toward the outside of the body 110.

In the disclosure, a state in which the connection member is maximally moved toward the outside of the body 110 along the guide rail is referred to as a pop-out state. Further, a state in which the connection member is maximally moved toward the inside of the body 110 along the guide rail is referred to as a basic state. The robot 100 according to various embodiments of the disclosure may perform wet cleaning while traveling in the basic state, and when it is required to perform cleaning with the spin module 162 in tight contact with the wall surface, the robot 100 may switch to the pop-out state to perform cleaning on the floor adjacent to the wall surface with the protruding spin module 162.

Figure 2:
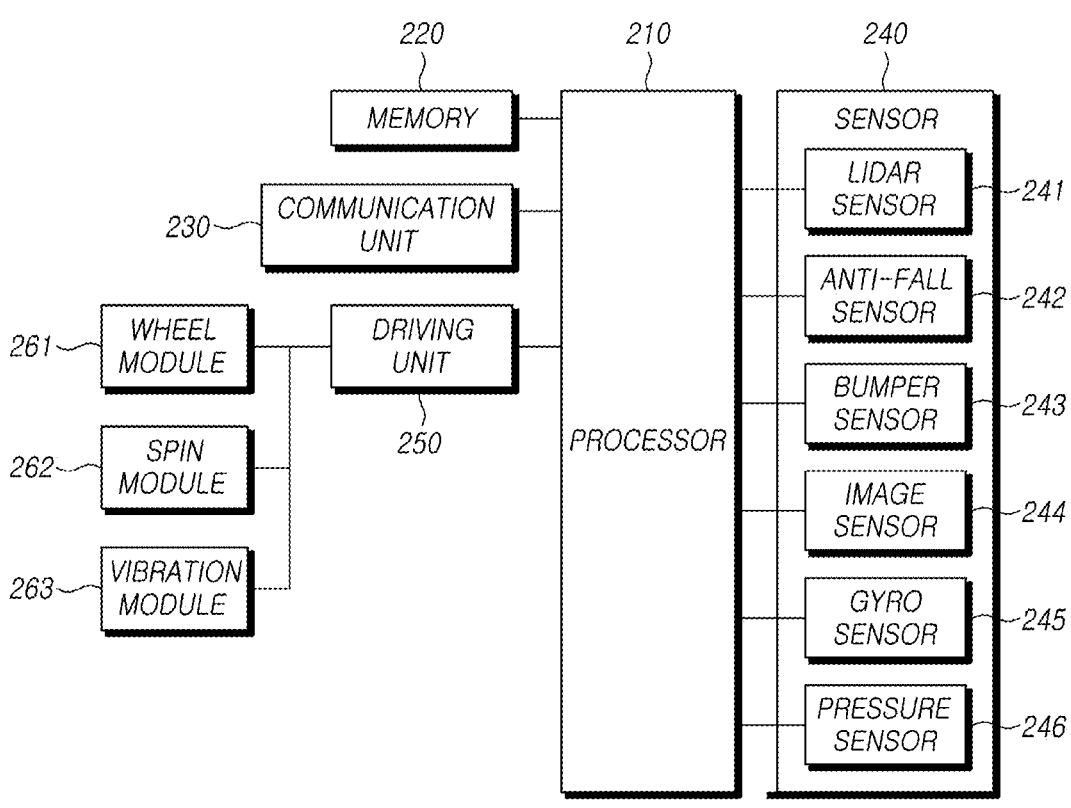
FIG. 2 is a block diagram illustrating a robot according to various embodiments of the disclosure.

FIG. 2 is a block diagram illustrating a robot according to various embodiments of the disclosure.

Referring to FIG. 2, a robot according to various embodiments of the disclosure may include a processor 210, a communication unit 230, and a memory 220. Here, the processor 210 may be electrically or functionally connected to the communication unit 230 and the memory 220. The processor 210 may control components constituting the robot by generating and transmitting a control command.

According to various embodiments of the disclosure, the processor 210 may include a storage and processing circuit unit for supporting the operation of the robot. The storage and processing circuit unit may include storage, such as non-volatile memory (e.g., flash memory, or other electrically programmable ROM configured to form an SSD) or volatile memory (e.g., static or dynamic RAM). The processing circuit unit in the processor may be used to control the operation of the robot. The processing circuit unit may be based on one or more microprocessor(s), microcontroller(s), digital signal processor(s), baseband processor(s), power management section(s), audio chip(s), or application specific integrated circuit(s).

According to various embodiments of the disclosure, the memory 220 may include a memory area for one or more processor for storing variables used in the protocol, configuration, control, and other functions of the robot, including operations corresponding to or including any one of the methods and/or procedures described as an example in the disclosure. Further, the memory may include non-volatile memory, volatile memory, or a combination thereof. Moreover, the memory may interface with a memory slot that enables insertion and removal of removable memory cards in one or more formats (e.g., SD card, Memory stick, compact flash, etc.).

According to various embodiments of the disclosure, the communication unit 230 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or modem for connecting the robot with a network (e.g., Internet, LAN, WAN, telecommunication network, cellular network, satellite network, POTS or 5G network). The RF module may be responsible for data transmission/reception, e.g., transmitting and receiving data RF signals or invoked electronic signals. As an example, the RF module may include, e.g., a power amp module (PAM), a frequency filter, or a low noise amplifier (LNA). The RF module may further include parts (e.g., conductors or wires) for communicating radio waves in a free space upon performing wireless communication.

According to various embodiments of the disclosure, the robot may include a sensor (unit) 240. The sensor 240 may include a LiDAR sensor 241, an anti-fall sensor 242, a bumper sensor 243, an image sensor 244, a gyro sensor 245, and a pressure sensor 246. The LiDAR sensor 241 is one of the distance sensors based on the ToF, and may generate a driving map for a space in which the robot is to travel. The anti-fall sensor 242 may measure the distance between the floor and the body using infrared rays or the like, and may identify that there is a height step if the measured distance increases. The image sensor 244 may be formed on one side surface of the robot to capture an image of an object located around the robot. The gyro sensor 245 may measure the inclination of the body. The pressure sensor 246 may be connected to one component of the robot to measure pressure due to contact with the outside.

According to various embodiments of the disclosure, the robot may include a driving unit 250. The robot may include one or more driving units 250. The driving unit 250 may be connected to at least one of the wheel module 261, the spin module 262, and the vibration module 263. In some cases, one driving unit 250 may be provided for each of the wheel module 261, the spin module 262, and the vibration module 263. The driving unit 250 includes a motor. The driving unit may control the wheel module 261 to move the robot. The driving unit 250 may control the spin module 262 and/or the vibration module 263 to perform operations according to various embodiments of the disclosure.

The processor 210 according to various embodiments of the disclosure may execute operations included in a method described below with reference to FIGS. 3 to 6. The processor 210 may execute a control command of at least one program stored in the memory 220 to realize the following operations.

Figure 3:
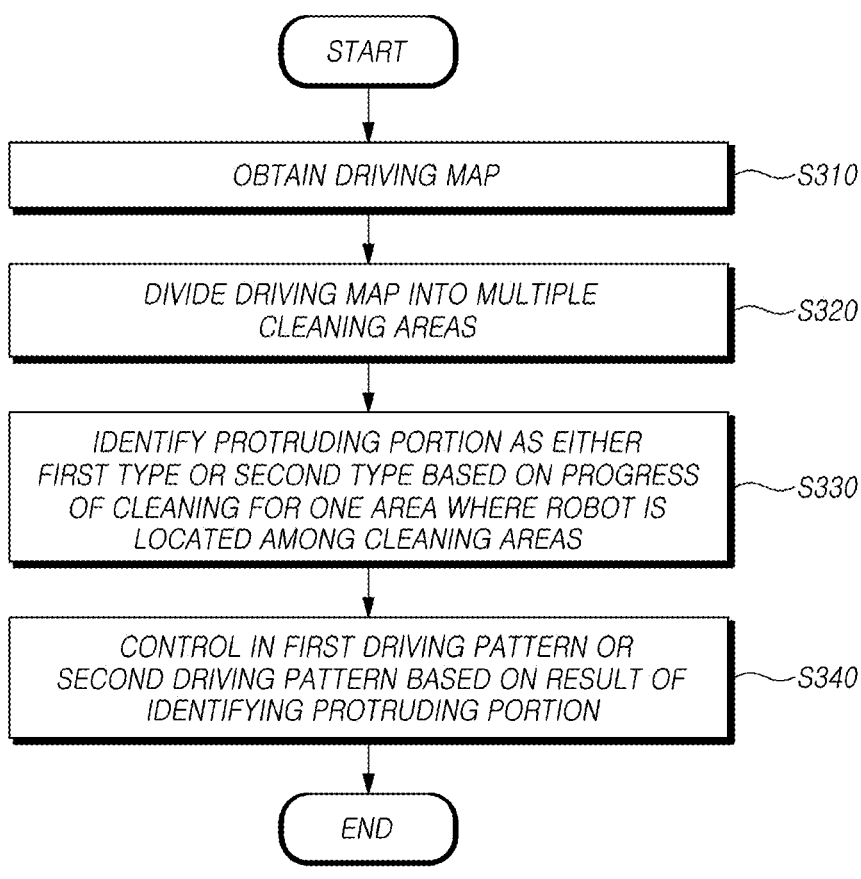

FIGS. 3 and 4 are flowcharts illustrating a control method according to various embodiments of the disclosure. FIG. 3 is a flowchart illustrating a method for differently controlling based on the nature of a protruding portion, and FIG. 4 is a flowchart illustrating a method for controlling in a predetermined escape pattern for escaping from a stuck state due to a protruding portion.

The control method according to various embodiments of the disclosure may include an operation in which the robot obtains a driving map (S310).

The robot 100 according to various embodiments of the disclosure may include a distance sensor (e.g., a radar sensor, a LiDAR sensor, an ultrasonic sensor, etc.) that senses a distance to an object by measuring a time when radio waves (or signals) are reflected and returned, such as a time of flight (ToF) method. In various embodiments, the robot 100 may measure the distance between the object and the robot 100 by emitting radio waves in a specific direction using the LiDAR sensor and measuring the time until the emitted radio waves are reflected and returned. The robot 100 may obtain a driving map for the space in which the robot 100 is located based on the repeated measurement results.

The robot 100 according to various embodiments of the disclosure may include a communication unit, and the user terminal according to various embodiments of the disclosure stores a driving map in a memory. The robot 100 may request the user terminal to transmit the driving map through the communication unit. The user terminal may transmit the driving map to the robot 100 in response to the request of the robot 100. Here, the driving map may be previously transmitted to the user terminal by the robot 100 or another electronic device. For example, before the driving map is stored in the memory of the user terminal, the robot 100 may obtain the driving map using the distance sensor and transmit the obtained driving map to the user terminal through the communication unit.

According to various embodiments of the disclosure, the robot 100 may update the driving map. For example, while the robot 100 is moving, an obstacle may be present on the driving path. Here, the obstacle may be any obstacle (e.g., threshold) that is not identified in the operation of obtaining the driving map for the first time. The robot 100 may identify any obstacle using a sensor (e.g., a bumper sensor). When any obstacle is identified, the robot 100 may reflect the location, shape, or size of the obstacle on the driving map. Accordingly, the robot 100 may move while avoiding or climbing any identified obstacle. In various embodiments of the disclosure, an obstacle newly identified by a sensor (e.g., a bumper sensor) may be determined as a protruding portion. In various embodiments of the disclosure, the driving pattern of the robot 100 may be changed based on the type of the protruding portion (see S330 below).

Further, according to various embodiments of the disclosure, when any obstacle is identified using a sensor (e.g., a bumper sensor), the robot 100 may transmit guidance information to the user terminal. The guidance information may include the driving map and information about any identified obstacle. Information about any obstacle includes the shape, the location, the size, and the like of the obstacle. In some cases, information about any obstacle may be provided in a state of being previously reflected on the driving map. When the user terminal receives the guidance information and the obstacle information, the user terminal may display the received information on the display screen through the application. The information about the object along with the driving map may be displayed on the application execution screen. The user terminal may adjust the location, range, shape, etc. of the obstacle based on a user input for information about the obstacle represented on the driving map. Further, based on the user input, the user terminal may newly generate a location, a range, a shape, etc. of the obstacle and represent them on the driving map regardless of the information about the obstacle obtained by the sensor of the robot 100. The user terminal may transmit the updated driving map to the robot 100 based on one or more user inputs, and the robot 100 receiving the updated driving map may perform operations according to various embodiments of the disclosure based on the updated driving map.

The controlling method according to various embodiments of the disclosure may include dividing the driving map into a plurality of cleaning areas (S320).

According to various embodiments of the disclosure, the robot 100 may generate a driving path to drive the entire area of the driving map, and may move based on the driving path. The entire area of the driving map may include one or more cleaning areas. The driving path may include a first driving path driving within each cleaning area in a predetermined pattern and a second driving path moving between the cleaning areas. The first driving path may include, e.g., a zigzag pattern, but is not limited thereto. The second driving path may be a shortest path starting from the last location of the first driving path until it is located in another cleaning area. As described above, the entire area of the driving map may include a plurality of cleaning areas, and the driving path includes an inner path (a first driving path) of each of the cleaning areas and a moving path (a second driving path) between the cleaning areas, and thus the cleaning areas need to be specified to set the driving path.

According to various embodiments of the disclosure, the cleaning areas may be divided based on the shape of the driving map. The driving map may include a plurality of rooms and entrances or passages connecting the rooms. The plurality of rooms are generally provided in a rectangular shape, but may be recognized as polygonal due to interior accessories disposed in the corresponding room. The robot 100 according to various embodiments of the disclosure may divide the driving map into a plurality of rectangular spaces by simplifying spaces recognized as polygons as rectangles. For example, when there are two or more rectangular spaces, the rectangular spaces do not overlap each other.

According to various embodiments of the disclosure, the robot 100 may distinguish at least some non-simplified areas of the driving map to correspond to their respective rectangular spaces. Accordingly, the cleaning areas may be specified. In various embodiments, a portion of a specific rectangular area, which is open and connected to another rectangular area, may be identified as an area (a first candidate area) in which a protruding portion is expected to be located. In various embodiments, the protruding portion may be located in at least a portion of the first candidate area, and the protruding portion may not be located in the remaining portion of the first candidate area. The first candidate area may be identified as the protruding portion based on the length of the long side. The first candidate area having a length less than a predetermined value may be selected, and it may be identified that the protruding portion is located in the selected first candidate area. Further, according to various embodiments of the disclosure, the protruding portion may be located in at least a portion of the first candidate area, and the protruding portion may not be located in the remaining portion. The first candidate area may be identified as the protruding portion based on the length of the long side. The first candidate area in which the length of the long side is less than a predetermined value may be selected, and the selected first candidate area may be identified as a second candidate area. The robot 100 may transmit the driving map reflecting the second candidate area to the user terminal. Based on the user input, the user terminal may determine that the protruding portion is located in a portion of one or more second candidate areas, and transmit the driving map reflecting the location of the protruding portion to the robot 100.

According to an embodiment of the disclosure, the protruding portion includes a hard protruding portion and a soft protruding portion. The hard protruding portion refers to a protruding portion (e.g., a threshold) having a hard floor material. The soft protruding portion includes a protruding portion having a soft floor material. In the case of the soft floor material, the robot 100 may be pushed as it moves forward, which may hinder the robot 100 from moving forward. In the case of the hard floor material, the robot 100 is not pushed while moving forward, but it is difficult for the robot 100 to climb over it according to the height.

According to various embodiments of the disclosure, the robot 100 may divide the driving map into a plurality of cleaning areas based on the location of the hard protruding portion. The location of the soft protruding portion is not a criterion for dividing into the cleaning areas, and accordingly, the location of the soft protruding portion may be excluded (or disregarded) from the identification target in operation S330 of identifying as the protruding portion of the first type or the second type. For example, the robot 100 may divide the driving map into a plurality of cleaning areas based on the location of the threshold. The plurality of cleaning areas may be partitioned based on the location of the hard protruding portion.

The protruding portion applied to various embodiments of the disclosure is for distinguishing a plurality of cleaning areas, and means that two opposite ends of the protruding portion are in contact with a boundary line of the driving map to form a closed space. For reference, the boundary line refers to the wall surface of the space as a line for expressing the structure of the house before dividing the cleaning areas. When at least one of two opposite ends of the protruding portion does not contact the boundary line of the driving map (i.e., when a cleaning area is not formed as a closed space), the protruding portion may not be used to form a plurality of cleaning areas, and may be excluded (or disregarded) from the identification target in operation S330, which identifies as the protruding portion of a first type or a second type.

Meanwhile, the method for dividing the cleaning areas applied to various embodiments of the disclosure is not limited thereto, and various means may be used to divide the cleaning areas or identify the location of the protruding portion.

The control method according to various embodiments of the disclosure may include identifying the protruding portion as one of the first type or the second type based on the progress of cleaning for one area where the robot is located among the cleaning areas (S330).

According to various embodiments of the disclosure, the robot 100 may sequentially drive each divided cleaning area rather than driving the entire area of the driving map without distinction, while performing a cleaning operation. For example, when the driving map is divided into a first cleaning area, a second cleaning area, and a third cleaning area, the robot 100 performs a cleaning operation while driving the first cleaning area in a predetermined driving pattern, and when the cleaning operation for the first cleaning area is completed, the robot 100 performs a cleaning operation for the second cleaning area having the next priority. In this case, the robot 100 may move from the first cleaning area to the second cleaning area by passing through a protruding portion separating the first and second cleaning areas.

The robot 100 according to various embodiments of the disclosure may identify the progress of cleaning for one cleaning area where the robot 100 is currently located. For example, assuming that the driving map is divided into a first cleaning area, a second cleaning area, and a third cleaning area, and the robot 100 is located in the second cleaning area, the robot 100 may perform a cleaning operation while driving the second cleaning area along a predetermined driving path. In this case, the predetermined driving path may be expressed as a length value, and the robot 100 may identify whether the robot 100 has completed driving in the second cleaning area based on the length value. When the robot 100 completes the cleaning operation for the currently located cleaning area (the second cleaning area according to the above assumption), it may be understood that the progress of cleaning has reached 100%.

The robot 100 according to various embodiments of the disclosure may identify the protruding portion (e.g., a hard protruding portion) as a first type (e.g., a climbing path) when the progress of cleaning is 100%, and may identify the protruding portion as a second type (e.g., an avoidance object or an obstacle) when the progress of cleaning is less than 100%.

The first type represents a boundary, and the protruding portion of the first type may be understood as a protruding portion having a characteristic of an entrance (or climbing path). The second type represents an obstacle, and the protruding portion of the second type may be understood as a protruding portion having a characteristic of an obstacle. The robot 100 according to various embodiments of the disclosure may move to another cleaning area through the protruding portion of the first type when the progress of cleaning is 100% and, if the progress of cleaning is less than 100%, performs a cleaning operation while driving in the currently located cleaning area until the progress of cleaning is 100%.

Figure 10:
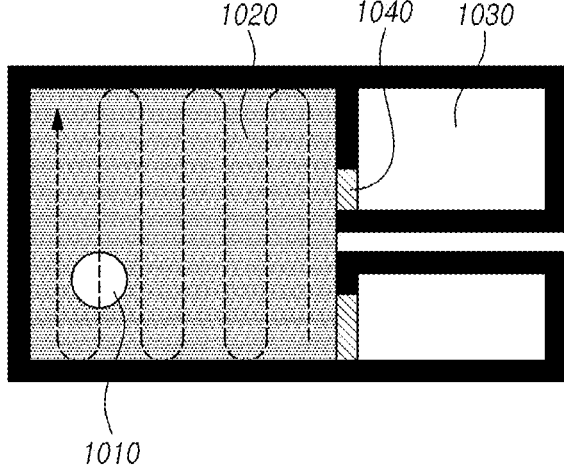
FIGS. 10 and 11 are reference views exemplarily illustrating an operation for switching properties of a protruding portion.

FIG. 10 exemplarily illustrates a driving map including a first cleaning area 1020 and a second cleaning area 1030, and a boundary 1040 located between the first and second cleaning areas 1020 and 1030. When the robot 1010 does not complete the cleaning operation in the first cleaning area 1020 where the robot 1010 is currently located, the boundary portion 1040 may be identified as the second type protruding portion. Accordingly, the robot 1010 may perform a cleaning operation only for the first cleaning area 1020 without driving to another cleaning area by climbing over the boundary 1040.

Figure 11:
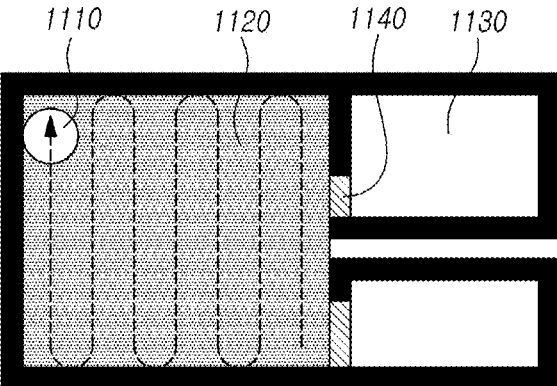

FIG. 11 exemplarily illustrates a driving map including a first cleaning area 1120 and a second cleaning area 1130, and a boundary 1140 located between the first and second cleaning areas 1120 and 1130. When the robot 1110 completes the cleaning operation in the first cleaning area 1120 where the robot 1110 is currently located, the boundary portion 1140 may be identified as a protruding portion of the first type. Accordingly, the robot 1110 may drive to another cleaning area by climbing over the boundary 1140.

Here, when there are two or more remaining cleaning areas for the robot to perform the cleaning operation except for the cleaning area where the robot is currently located, two or more boundary portions may be present. In an embodiment, the two or more boundaries may be identified as protruding portions of the first type while the robot performs the operation of moving to another cleaning area. In another embodiment, one of the two or more boundary portions may be identified as a protruding portion of the first type, and the other may be identified as a protruding portion of the second type while the robot moves to another cleaning area. Here, the protruding portion of the first type may be determined to be located closer to the current robot.

The control method according to various embodiments of the disclosure may include an operation of controlling in the first driving pattern or the second driving pattern based on the identification result of the protruding portion (S340).

According to various embodiments of the disclosure, operation S340 may include an operation of, if the protruding portion is identified as the first type, controlling in the first driving pattern of climbing over the protrusion of the first type.

According to various embodiments of the disclosure, when the protruding portion is identified as the first type, the protruding portion may be an entrance for moving from the cleaning area where the robot is currently located to another cleaning area. However, since it is difficult for the robot to easily pass through the protruding portion of the first type due to its height, the robot moves in a new driving pattern distinguished from the normal driving pattern. According to various embodiments of the disclosure, the robot may climb over the protruding portion of the first type in the first driving pattern distinguished from the normal driving pattern. The first driving pattern is described below in detail.

According to various embodiments of the disclosure, the first driving pattern may include an operation of moving forward and climbing over the protruding portion of the first type. According to various embodiments of the disclosure, the robot may control to stop the operation of the spin module before moving forward to climb forward. According to various embodiments, when the spin module protrudes in the pop-out state before moving forward to climb forward, the robot may return the protruding spin module to the inside of the body. According to various embodiments, the robot may disregard the detection signal by the bumper sensor to prevent the protruding portion from being recognized as an obstacle due to the bumper sensor while moving forward to climb forward. In the robot according to various embodiments of the disclosure, since the inclined protrusion is formed in front of the spin module, the front of the body gets away from the floor by a predetermined height by the inclined protrusion before the spin module and the protruding portion of the first type come into contact with each other. As a result, the spin module does not contact the protruding portion of the first type, and the robot may climb over the protruding portion of the first type without difficulty.

According to various embodiments of the disclosure, the first driving pattern may include an operation of moving backward to climb over the protruding portion of the first type. According to various embodiments of the disclosure, the robot may control to stop the operation of the spin module before moving backward to climb backward. According to various embodiments, when the spin module protrudes in the pop-out state before moving backward to climb backward, the robot may return the protruding spin module to the inside of the body. In the robot according to various embodiments of the disclosure, since the rear slope structure is formed in the rear of the body, the rear of the body gets away from the floor by a predetermined height by the slope structure before the spin module and the protruding portion of the first type come into contact with each other. As a result, the spin module does not contact the protruding portion of the first type, and the robot may climb over the protruding portion of the first type without difficulty.

Further, in the first driving pattern according to various embodiments of the disclosure, the operation of the vibration module may be stopped. In other words, the vibration module may be deactivated. This is because, while climbing forward or backward based on the first driving pattern, the operation of the vibration module, like the spin module, may interfere with the climbing operation. When the first driving pattern is terminated and driving is performed in the second driving pattern, the stopped vibration module is operated again.

Figure 12:
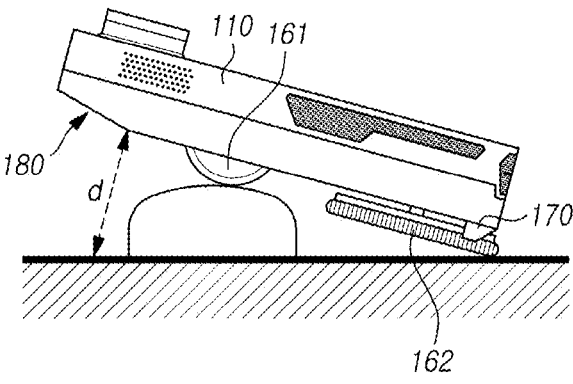
FIG. 12 is a reference view exemplarily illustrating an operation for adjusting a sensing value of an anti-fall sensor.

According to various embodiments of the disclosure, the first driving pattern may further include adjusting the sensitivity of the anti-fall sensor while climbing over the protruding portion of the first type. In other words, the robot may adjust the sensitivity of the anti-fall sensor while climbing over the protruding portion of the first type in the first driving pattern. While climbing forward or backward, the front or rear of the robot gets away from the floor by a significant distance and, when the sensitivity of the anti-fall sensor is not adjusted, the robot misdetermines that there is a height step and may thus perform the operation of avoiding the current location. This may be understood by referring to FIG. 12. Referring to FIG. 12, the body of the robot gets away from the floor by a predetermined distance d while climbing over the protruding portion of the first type. Assuming that the body is parallel to the floor, the robot may misdetect that there is currently a risk of falling. Accordingly, the robot needs to differently process a sensing signal and a sensing value generated by the anti-fall sensor, and the anti-fall sensor.

In order to prevent misdetection of the anti-fall sensor in such a climbing operation, the robot may reduce the sensitivity of the anti-fall sensor while operating in the first driving pattern. In the method for reducing the sensitivity, e.g., the robot may set a threshold value for generating a sensing signal by the anti-fall sensor to be higher, and in another example, the robot may measure a measurement value by the anti-fall sensor as lower by applying a predetermined correction rate, but is not limited thereto.

According to various embodiments of the disclosure, when a plurality of anti-fall sensors are provided, the robot may reduce sensitivity by selecting at least some of the plurality of anti-fall sensors. According to various embodiments of the disclosure, the robot may select at least some of the plurality of anti-fall sensors based on the driving direction of the robot, and may reduce the sensitivity of the selected anti-fall sensor. For example, when climbing forward, the robot may select at least one anti-fall sensor located in front of the body among the anti-fall sensors and reduce the sensitivity. For example, when climbing backward, the robot may select at least one anti-fall sensor located behind the body among the anti-fall sensors and reduce the sensitivity.

Meanwhile, the robot may not only reduce the sensitivity of the anti-fall sensor(s) described above, but also deactivate the anti-fall sensor or disregard the sensing signal generated by the anti-fall sensor while the climbing operation is performed.

According to various embodiments of the disclosure, the first driving pattern may further include capturing the protruding portion of the first type through the image sensor before climbing forward or backward. The robot according to various embodiments of the disclosure may include an image sensor in at least one of a front side or a rear side. The image sensor may photograph an object within a viewing angle. The robot may transmit the captured image to the user terminal through the communication unit. The user terminal may display the received image on the display through a predetermined application. The user may visually identify the protruding portion of the first type through the display of the user terminal. In some cases, if it is identified as a protruding portion of the first type, although not a protruding portion of the first type, due to misdetection of the robot, and an associated image is transmitted to the user terminal, the user may manipulate the user terminal to transmit a control command to the robot. Thereafter, the robot may perform an operation corresponding to the control command received from the user terminal.

According to various embodiments of the disclosure, the first driving pattern may disregard a sensing signal generated by the bumper sensor before or while climbing over the protruding portion of the first type. In other words, the robot may disregard the sensing signal generated by the bumper sensor while climbing over the protruding portion of the first type in the first driving pattern. While performing climbing forward or backward, the robot physically collides with the protruding portion of the first type, and as a result, it may be detected that an obstacle is present in a direction in which the bumper sensor is provided. While operating in the first driving pattern, the protruding portion of the first type is not an obstacle, and thus the detection result may be viewed as a misdetection. According to various embodiments of the disclosure, the robot may disregard the sensing signal generated by the bumper sensor or reduce the sensitivity of the bumper sensor to prevent the protruding portion from being misrecognized as an obstacle due to the bumper sensor while the climbing operation is performed. Accordingly, although the bumper and the protruding portion collide while the robot according to various embodiments of the disclosure climbs forward or backward, the collision does not affect the climbing operation based on the first driving pattern.

According to various embodiments of the disclosure, operation S340 may include an operation of, if the protruding portion is identified as the second type, controlling in the second driving pattern of avoiding the protruding portion of the second type.

According to various embodiments of the disclosure, when the protruding portion is identified as the second type, the protruding portion becomes an obstacle for preventing the robot from moving from the cleaning area where the robot is currently located to another cleaning area. A robot according to various embodiments of the disclosure recognizes a protruding portion of a second type as an obstacle so as not to pass through the protruding portion of the second type, and moves in a driving pattern of avoiding the protruding portion of the second type. This driving pattern is referred to as a second driving pattern. The second driving pattern may be understood as a driving pattern that performs a cleaning operation while driving in a predetermined cleaning area while avoiding an obstacle. The robot may perform a cleaning operation while driving in the currently located cleaning area based on the second driving pattern, and if the cleaning progress for the currently located cleaning area reaches 100%, the robot may change the protruding portion from the second type to the first type, and control to climb over the protruding portion of the first type based on the first driving pattern.

FIG. 4 is a flowchart illustrating a method for controlling a robot to escape from a stuck state according to various embodiments of the disclosure.

Referring to FIG. 4, among the operations illustrated in FIGS. 4, S410 and S420 are the same as S310 and S320 of FIG. 3, and thus no further description thereof is given, with the following description focusing primarily on newly added operations.

The control method according to various embodiments of the disclosure may include an operation of moving to another cleaning area if the cleaning operation for any one of the cleaning areas is completed (S430).

The robot according to various embodiments of the disclosure may move from the currently located cleaning area to another cleaning area if the progress of cleaning reaches 100%. Further, if the progress of the cleaning is less than 100%, the robot may perform the cleaning operation while driving along the remaining driving path of the currently located cleaning area.

Meanwhile, according to various embodiments of the disclosure, the operation of moving to another cleaning area may include operation S340 described above with reference to FIG. 3. In other words, to move to another cleaning area, operation S430 may also include an operation of controlling in the first driving pattern or second driving pattern based on the result of identifying the protruding portion. In the case of the protruding portion of the first type, i.e., the entrance, the robot may climb over the protruding portion of the first type based on the first driving pattern.

The controlling method according to various embodiments of the disclosure may include, when moving to another cleaning area, identifying a stuck state due to the protruding portion using the sensor unit (S440).

According to various embodiments of the disclosure, the robot may include one or more sensors for identifying a stuck state. For example, the sensor for identifying the stuck state may include at least one of a gyro sensor or a LiDAR sensor.

According to various embodiments of the disclosure, while it is in a normal state that the location of the robot is changed while the wheel module rotates, the location of the robot is not changed while the wheel module rotates when it corresponds to the stuck state. In other words, the robot according to various embodiments of the disclosure may identify the location of the robot using the LiDAR sensor while the wheel module rotates, and identify the stuck state based on the change in the location of the robot.

Further, according to various embodiments of the disclosure, the robot may identify the inclination of the robot using a gyro sensor. When it is determined that the inclination identified by the gyro sensor does not change for a predetermined time or that the measured change does not exceed a threshold range, the robot may be currently in the stuck state. In other words, the robot according to various embodiments of the disclosure may identify the inclination of the robot using the gyro sensor, and identify the stuck state based on the identified inclination, more specifically, the duration of the inclination.

The control method according to various embodiments of the disclosure may include an operation of controlling in the escape pattern for escaping from the stuck state (S450).

According to various embodiments of the disclosure, a spin module and/or a pop-out module may be used to escape from the stuck state. The operation for escaping from the stuck state is performed based on the frictional force with the floor generated by the spin module.

According to various embodiments of the disclosure, the spin module may generate a forward moving frictional force for moving the body forward or a backward moving frictional force for moving the body backward. The spin module may generate a left-facing moment frictional force for turning the body left and a right-facing moment frictional force for turning the body right. The spin module may generate a frictional force by combining any one of the forward moving frictional force and the backward moving frictional force, the left-facing moment frictional force, and the right-facing moment frictional force. To generate the forward moving frictional force, the robot may rotate the left spin module clockwise and the right spin module counterclockwise when viewed from above. To generate the backward moving frictional force, the robot may rotate the left spin module counterclockwise and rotate the right spin module clockwise when viewed from above. In order to generate the right-facing moment frictional force, when viewed from above, the robot may rotate the left spin module clockwise, and rotate the right spin module clockwise, stop, or rotate the right spin module counterclockwise at an RPM smaller than that of the left spin module. In order to generate the left-facing moment frictional force, when viewed from above, the robot may rotate the right spin module counterclockwise, and rotate the left spin module counterclockwise, stop, or rotate the left spin module clockwise at an RPM smaller than that of the right spin module.

According to various embodiments of the disclosure, the robot may escape from the stuck state using the frictional force obtained by combining any one of the forward moving frictional force and the backward moving frictional force, and any one of the left-facing moment frictional force and the right-facing moment frictional force generated by the spin module. Meanwhile, escape patterns according to various embodiments of the disclosure are described below with reference to FIGS. 5 and 6.

Figure 5:
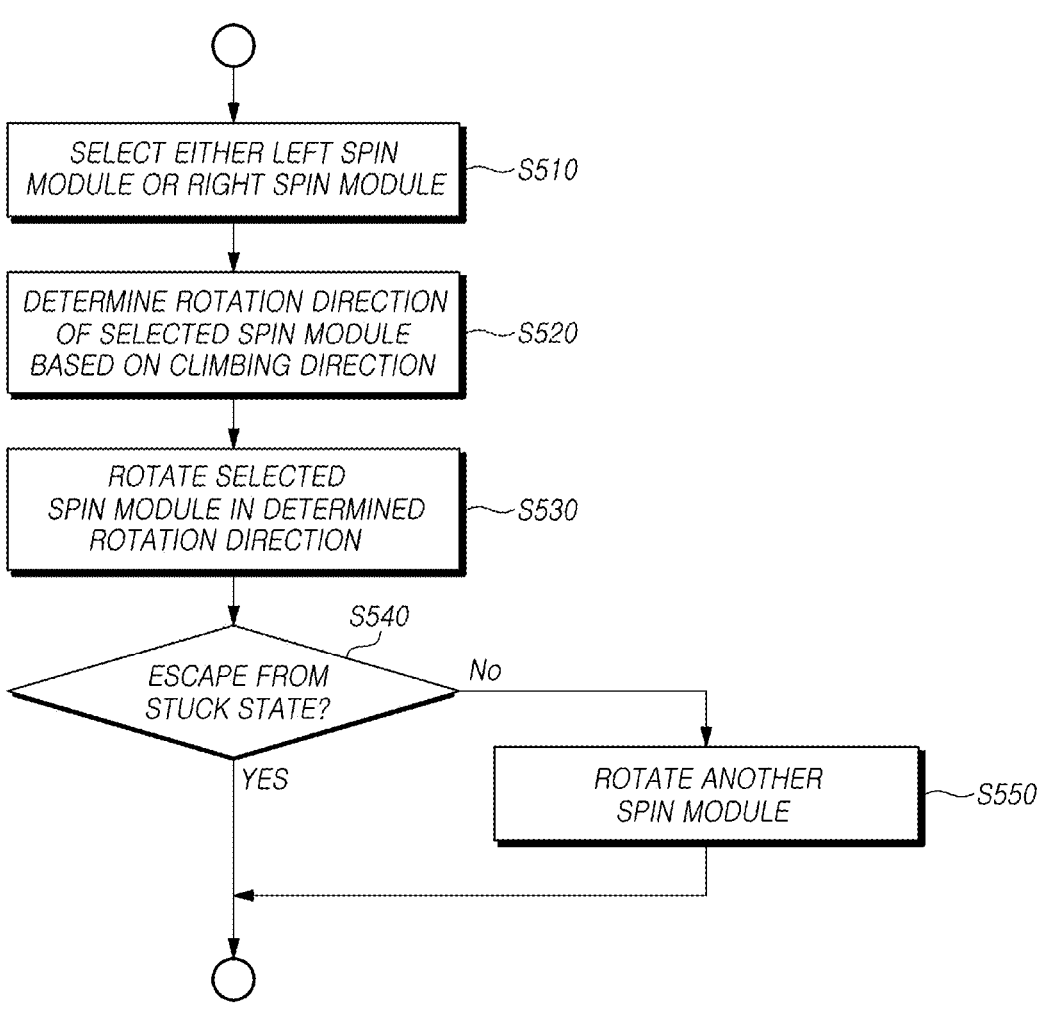
FIGS. 5 and 6 are flowcharts illustrating an escape pattern according to various embodiments of the disclosure.
Figure 6:
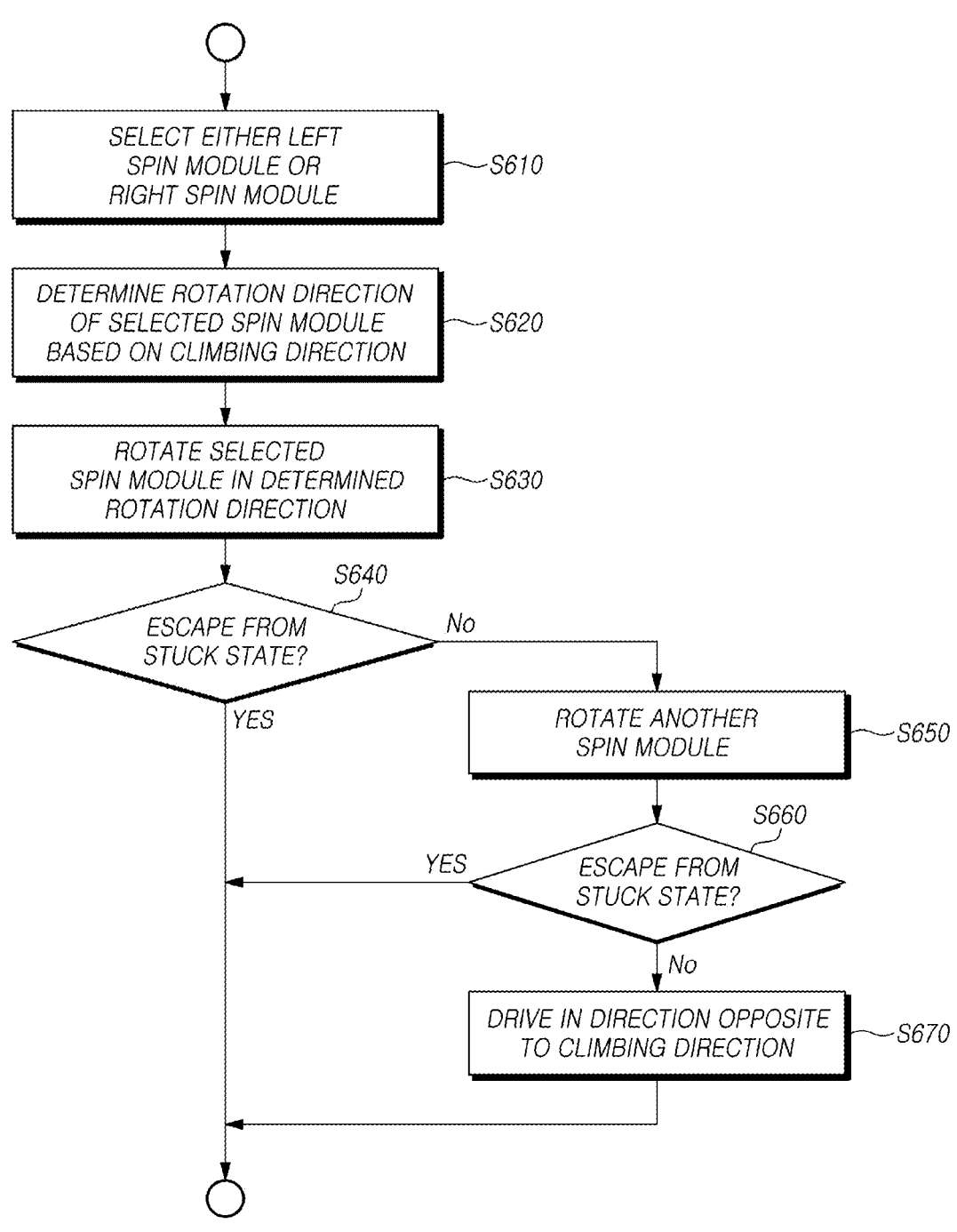

FIGS. 5 and 6 are flowcharts illustrating an escape pattern according to various embodiments of the disclosure.

Operations illustrated in FIGS. 5 and 6 may be included in the escape patterns mentioned in S450 of FIG. 4. Hereinafter, an example of an escape pattern is described with reference to FIG. 5.

According to various embodiments of the disclosure, the robot may include a gyro sensor for measuring the inclination of the body. According to various embodiments, the robot may measure the inclination of the body using the gyro sensor. The robot may be, e.g., tilted to either the left side or the right side in the stuck state.

According to various embodiments of the disclosure, the robot may include a pressure sensor for measuring the inclination of the body. According to various embodiments, the robot may measure the inclination of the body using a pressure sensor. The pressure sensor may be included in the spin module. The robot may be tilted to, e.g., either the left side or the right side, and at this time, either the left spin module or the right spin module may contact the floor. When only the left spin module contacts the floor, the robot may identify the sensing signal from the left through the pressure sensor provided in the left spin module, and determine that the body is tilted to the left side. When only the right spin module contacts the floor, the robot may identify the sensing signal from the right through the pressure sensor provided in the right spin module, and determine that the body is tilted to the right side. Meanwhile, the robot according to various embodiments of the disclosure may include at least one of a gyro sensor and a pressure sensor for measuring an inclination, and is not limited to having any one of the two.

The robot according to various embodiments of the disclosure may select any one of the left spin module or the right spin module based on the direction in which the body is tilted (S510).

For example, when the body is tilted to the left side, the robot may select the left spin module. As another example, when the body is tilted to the right side, the robot may select the right spin module. According to various embodiments of the disclosure, the robot may rotate any one of the selected left spin module or the selected right spin module. For example, when the body is tilted to the left side, the robot may select and rotate the left spin module. As another example, when the body is tilted to the right side, the robot may select and rotate the right spin module. The spin module located in the tilted direction may be in stronger contact with the floor. The robot according to various embodiments of the disclosure may generate a stronger frictional force by rotating the spin module that is in stronger contact with the floor than other spin modules.

According to various embodiments of the disclosure, the robot may determine the rotation direction of the left spin module or the right spin module selected based on the climbing direction (S520). Further, according to various embodiments of the disclosure, the robot may rotate the selected left spin module or right spin module in the determined rotation direction (S530).

According to various embodiments of the disclosure, when a stuck state is identified during forward climbing, it is preferable that the robot moves forward to escape from the stuck state. When the step state is identified during forward climbing and the body is tilted to the left side, the robot may rotate the left spin module clockwise when viewed from above to generate a forward moving frictional force. When the stuck state is identified during forward climbing and the body is tilted to the right side, the robot may rotate the right spin module counterclockwise when viewed from above to generate the forward moving frictional force.

According to various embodiments of the disclosure, when the stuck state is identified during backward climbing, it is preferable that the robot moves backward to escape from the stuck state. When the stuck state is identified during backward climbing and the body is tilted to the left side, the robot may rotate the left spin module counterclockwise when viewed from above to generate the backward moving frictional force. When the stuck state is identified during backward climbing and the body is tilted to the right side, the robot may rotate the right spin module clockwise when viewed from above to generate the backward moving frictional force.

According to various embodiments of the disclosure, the robot may re-identify the stuck state due to the protruding portion using the sensor unit (S540). Further, according to various embodiments of the disclosure, when the spin module selected based on the inclination direction is rotated according to a predetermined condition and does not escape from the stuck state, the robot may rotate another spin module (S550).

According to an embodiment of the disclosure, when the robot escapes from the stuck state, the robot may stop the escape pattern and drive through the newly located cleaning area. When the robot does not escape from the stuck state, the robot may perform an additional operation included in the escape pattern.

According to various embodiments of the disclosure, the robot may select either the left spin module or the right spin module based on the inclination of the body, and rotate the selected spin module. Further, according to various embodiments of the disclosure, the robot may detect a change in the inclination of the body due to the rotation of the selected spin module through a sensor (e.g., at least one of a gyro sensor or a pressure sensor). According to various embodiments, the robot may identify, through a sensor, a change in the inclination of the body while the selected spin module rotates or after the spin module rotates for a predetermined time. When the change in the inclination of the body is identified to be larger than or equal to a predetermined value, the robot may continue the rotation of the selected spin module again for a predetermined time even after the initially set predetermined time elapses. The rotation of the spin module may continue until the inclination of the robot is detected as horizontal or the robot is detected to be moving.

According to various embodiments of the disclosure, the robot may rotate the remaining spin module other than the selected spin module when the tilted state is maintained even when rotating the selected spin module for the predetermined time. In this case, the directions in which the remaining spin module rotates may be determined based on the climbing direction. When the stuck state is identified during forward climbing, the robot may rotate the remaining spin module in a direction opposite to the pre-selected spin module to generate a forward moving frictional force. When the stuck state is identified during backward climbing, the robot may rotate the remaining spin module in a direction opposite to the pre-selected spin module in order to generate the backward moving frictional force. In other words, when the selected spin module is rotated so as not to escape from the stuck state, the robot may attempt to escape from the stuck state by rotating the left spin module and the right spin module in different directions.

According to various embodiments of the disclosure, a rotation operation of another spin module may be performed by a combination of the rotation operations by the left spin module and the right spin module. According to an embodiment, the robot may control the spin modules to rotate sequentially in the order of one spin module and another spin module. According to another embodiment, the robot may control the spin modules to rotate sequentially in the order of one spin module, another spin module, and all the spin modules. According to another embodiment, the robot may control the spin modules to rotate sequentially in the order of one spin module and all the spin modules. A rotation time of each of one spin module, another spin module, and all the spin modules may be preset as a predetermined time.

Hereinafter, another example of the escape pattern is described with reference to FIG. 6.

Among the operations illustrated in FIG. 6, operations S610, S620, S630, S640, and S650 are the same as operations S510, S520, S530, S540, and S550 of FIG. 5, and no further description thereof is given, with the following description focusing primarily on S660 and S670 newly added.

Referring to FIG. 6, the robot according to various embodiments of the disclosure may again identify the stuck state due to the protruding portion using the sensor unit (S660).

In operation S660, as in operation S640, the robot may identify, through the sensor, a change in the inclination of the body while the selected spin module rotates or after the spin module rotates for a predetermined time. When the change in the inclination of the body is identified to be larger than or equal to a predetermined value, the robot may continue the rotation of the selected spin module again for a predetermined time even after the initially set predetermined time elapses. The rotation of the spin module may continue until the inclination of the robot is detected as horizontal or the robot is detected to be moving.

According to various embodiments of the disclosure, even though the spin module is rotated for a predetermined time, when a change in the inclination of the body is not detected or the detected change in the inclination is less than a threshold value, the robot may move in a direction opposite to the climbing direction (S670).

In the case of forward climbing, the robot may move backward. In the case of backward climbing, the robot may move forward. In other words, the robot may move in a direction opposite to the direction in which it was moving for climbing. In spite of the above-described S610 to S650, when the robot does not escape from the stuck state, the robot gives up climbing over the protruding portion and returns to its original location. The protruding portion where climbing has failed may be changed in type into obstacle, preventing a repeated climbing attempt.

Meanwhile, according to various embodiments of the disclosure, a pop-out module may be used to escape from the stuck state. The control operation using the pop-out module is not limited to being included in the escape pattern illustrated in FIG. 6, and may also be included in the escape patterns of FIGS. 4 and 5. According to various embodiments, before the spin module rotates to escape from the stuck state, or while the spin module rotates, the robot may protrude the spin module out of the body using the pop-out module. As the spin module protrudes to the outside, the pressure between the spin module and the floor contacting the corresponding protruding spin module increases. The increase in pressure causes an increase in the frictional force between the spin module and the floor. As such, the robot may more easily escape from the stuck state by increasing the frictional force between the spin module and the floor using the pop-out module.

Further, according to various embodiments of the disclosure, a vibration module may be used to escape from the stuck state. The control operation using the vibration module is not limited to being included in the escape pattern illustrated in FIG. 6, and may also be included in the escape patterns of FIGS. 4 and 5. According to various embodiments, before the spin module rotates to escape from the stuck state, or while the spin module rotates, the robot may cause vibration in the rear of the body by operating the vibration module. As such, the vibration caused in the rear of the body causes the spin module to contact the floor at an irregular pressure, and the irregular pressure may make it easier to escape the stuck state.

Figure 7:
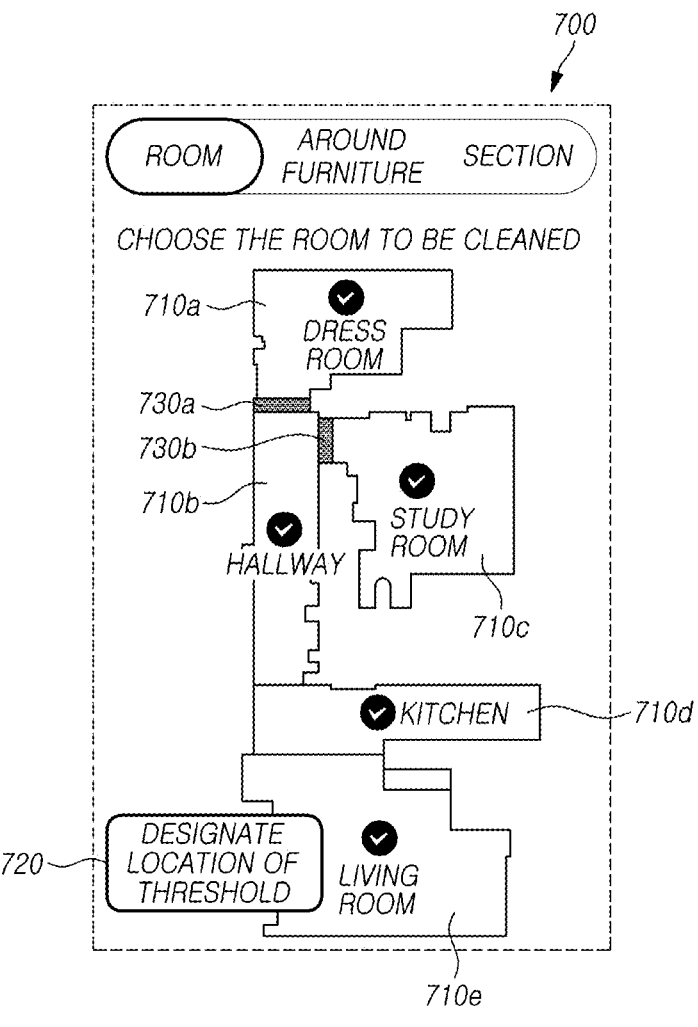
FIGS. 7 to 9 are reference views exemplarily illustrating an application execution screen of a user terminal for generating a driving map.
Figure 8:
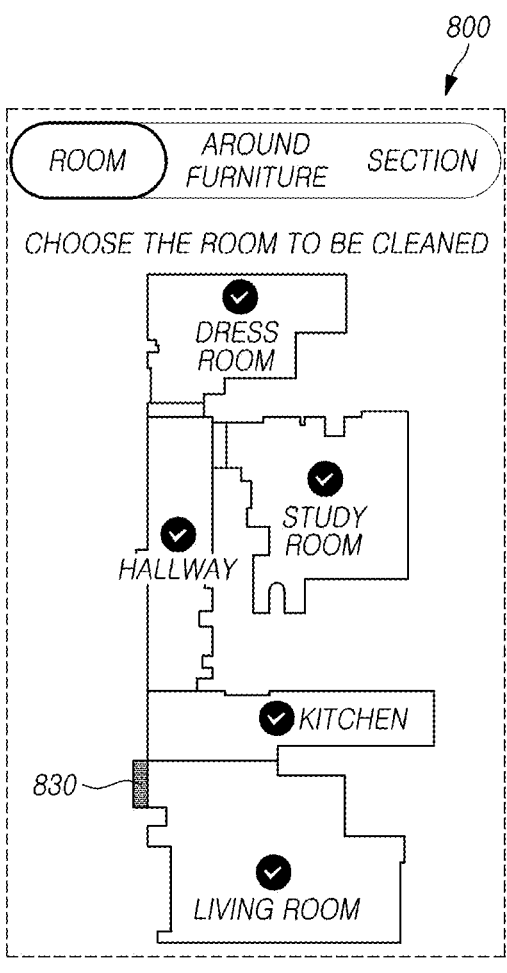
Figure 9:
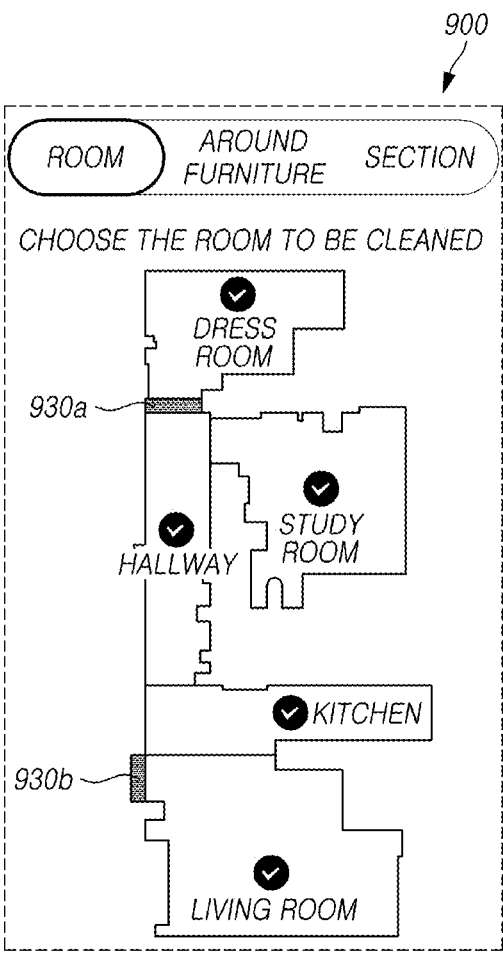

FIGS. 7 to 9 are reference views exemplarily illustrating an application execution screen of a user terminal for generating a driving map.

The application execution screens 700, 800, and 900 may include the entire area of the driving map. Referring to FIG. 7, the entire area of the driving map included in the application execution screen 700 may be divided into a plurality of cleaning areas 710a, 710b, 710c, 710d, and 710e. For example, the entire area of the driving map may be divided into a dressing room (a first cleaning area 710a), a study room (a second cleaning area 710c), a hallway (a third cleaning area 710b), a kitchen (a fourth cleaning area 710d), and a living room (a fifth cleaning area 710e). The plurality of cleaning areas may be divided by the plurality of boundary portions. At least some of the boundary portions may be protruding portions (e.g., thresholds).

Meanwhile, at least some of the boundary portions may not be identified as protruding portions although they are boundary portions between cleaning areas. Based on the lengths of the boundary portions, at least some of the boundary portions may be identified as protruding portions, and remaining some may not be identified as protruding portions. A boundary portion having a length value equal to or larger than a predetermined value may not be identified as a protruding portion, and a boundary portion having a length value less than a predetermined value may be identified as a protruding portion.

For example, at least one of the first boundary portion between the first cleaning area 710a and the third cleaning area 710b and the second boundary portion between the second cleaning area 710c and the third cleaning area 710b may be a protruding portion. The boundary portion present between the first cleaning area 710a and the third cleaning area 710b may have a length less than the predetermined value, and the corresponding boundary portion 710b may be identified as a protruding portion. As another example, a protruding portion is not set between the fourth cleaning area 710d and the fifth cleaning area 710e, which may be because the length of the boundary portion is larger than or equal to a predetermined value.

Further, the protruding portion may be identified based on nature (or attributes) of the cleaning areas 710a, 710b, 710c, 710d, and 710e. The cleaning area may be variously classified according to the use of the space. For example, the cleaning area may be classified into a dressing room, a hallway, a study room, a kitchen, a living room, and the like. The nature of the cleaning area is not limited thereto, but may be identified based on the location and/or type of the object present in the corresponding space, or may be set based on a user input to the application. For example, it may be preset that there is no protruding portion between the kitchen (e.g., 710d) and the living room (e.g., 710e). As another example, it may be preset that there is no protruding portion between the kitchen (e.g., 710d) and the hallway (e.g., 710b).

According to various embodiments of the disclosure, one or more boundary portions may be displayed on the driving map. The boundary portion may be understood as a candidate area (e.g., a first candidate area or a second candidate area) mentioned in S320 of FIG. 3. One or more candidate areas 730a and 730b may be included on the driving map. The user terminal may switch the candidate areas 730a and 730b to the protruding portion based on a user input to the application execution screen 700. For example, when a user input to the candidate areas 730a and 730b is received, the user terminal may switch the candidate areas 730a and 730b at the locations where the input is received, into the protruding portions.

According to various embodiments of the disclosure, the candidate areas 730a and 730b may be represented on the application execution screen 700 based on a user input. For example, when a user input to the icon 720 is received, the user terminal may represent the candidate areas 730a and 730b on the driving map.

Referring to FIG. 8, the user terminal may designate a new protruding portion 830 based on a user input. The designated protruding portion 830 may be represented on the driving map. The designation of the protruding portion 830 may be made based on the user's touch input to the touch screen. For example, the protruding portion 830 may be represented on the application execution screen 800 based on the user's drag input.

The protruding portion 730a switched through the application execution screen 700 illustrated in FIG. 7 and the protruding portion 830 designated through the application execution screen 800 illustrated in FIG. 8 may be represented on the driving map as in the application execution screen 900 illustrated in FIG. 9. Referring to FIG. 9, in the application execution screen 700 illustrated in FIG. 7, a candidate area 730b that is not switched to a protruding portion based on a user input is not represented, and a candidate area 730a that is switched based on a user input is represented as a protruding portion. Further, on the application execution screen 800 illustrated in FIG. 8, the protruding portion 830 designated based on the user input is represented together.

When the application execution screen 700 of FIG. 7 is referred to as a first execution screen, the application execution screen 800 of FIG. 8 is referred to as a second execution screen, and the application execution screen 900 of FIG. 9 is referred to as a third execution screen, the user terminal may set a protruding portion through the first execution screen, and may display the second execution screen on the display in response to completing the setting. The user terminal may designate a protruding portion through the second execution screen, and may display the third execution screen on the display in response to completing the designation. In this case, the display order of the first execution screen and the second execution screen may be changed with respect to each other.

The user terminal may transmit the third execution screen to the robot, and the robot may perform the control method described with reference to FIGS. 3 to 6 based on the received third execution screen.

The electronic device according to various embodiments of the disclosure may be one of various types of electronic devices. The electronic devices may include, for example, a display device, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to various embodiments, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the robot or cleaning robot 100 or 200 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A robot, comprising:
a body;
a spin module on a lower side of the body;
a pop-out module connected to the spin module;
a sensor which is distance sensor or a gyro sensor;
a memory storing at least one instruction; and
a processor configured to execute the at least one instruction to:
divide a driving map into a plurality of cleaning areas based on one or more boundaries,
based on a boundary of the one or more boundaries being identified as a protruding portion, identify a type of the protruding portion based on a cleaning progress for an area where the robot is located among the plurality of cleaning areas,
identify a stuck state using the sensor, and
when the stuck state is identified, control the pop-out module to protrude the spin module outside of the body.

2. The robot of claim 1, wherein
the processor is configured to execute the at least one instruction to perform control to drive the robot with any one of a plurality of driving patterns based on the identified type of the protruding portion,
the plurality of driving patterns include a first driving pattern for climbing over the protruding portion and a second driving pattern for avoiding the protruding portion, and
the processor is configured to execute the at least one instruction to perform control with the first driving pattern based on the protruding portion being identified as a first type of protruding portion and perform control with the second driving pattern based on the protruding portion being identified as a second type of protruding portion.

3. The robot of claim 2, further comprising:
a bumper sensor configured to detect an obstacle in front of the robot,
wherein the processor is configured to execute the at least one instruction to disregard a sensing signal generated by the bumper sensor when performing control with the first driving pattern.

4. The robot of claim 2, further comprising:
an anti-fall sensor configured to detect a height step,
wherein the processor is configured to execute the at least one instruction to, when performing control with the first driving pattern, decrease a sensitivity of the anti-fall sensor, deactivate the anti-fall sensor, or disregard a sensing signal generated by the anti-fall sensor.

5. The robot of claim 2, wherein
the spin module has an attaching portion to which a mop cloth is attachable, on a lower side of the spin module, and
the processor is configured to execute the at least one instruction to stop rotating the spin module when performing control with the first driving pattern, and rotate the spin module when performing control with the second driving pattern.

6. The robot of claim 5, wherein:

the processor is configured to execute the at least one instruction to, when performing control with the first driving pattern and the spin module protrudes outside the body by the pop-out module, move the spin module inside the body.

7. The robot of claim 2, further comprising:

a vibration module on a lower side of the body, wherein the vibration module has an attaching portion to which a mop cloth is attachable, on a lower side of the vibration module, and wherein the processor is configured to execute the at least one instruction to stop vibrating the vibration module when performing control with the first driving pattern, and to vibrate the vibration module when performing control with the second driving pattern.

8. The robot of claim 2, wherein the body includes an inclined protrusion at a front of the body, and the first driving pattern includes climbing over forward of the body.

9. The robot of claim 2, wherein the body includes a rear slope structure, and the first driving pattern includes climbing over rearward of the body.

10. The robot of claim 1, wherein the spin module includes a left spin module and a right spin module, and the processor is configured to execute the at least one instruction to, when performing control with an escape pattern based on the stuck state being identified, perform control to escape from the stuck state by rotating the left spin module or the right spin module to generate a frictional force which combines any one of a forward movement frictional force and a rear movement frictional force, a left moment frictional force, and a right moment frictional force.

11. The robot of claim 1, wherein the spin module includes a left spin module and a right spin module, and the processor is configured to execute the at least one instruction to, when performing control with an escape pattern based on the stuck state being identified, identify a tilt of the body using the gyro sensor, select the spin module located in a direction in which the body is tilted of the left spin module or the right spin module, and rotate the selected spin module.

12. A method for controlling a robot that includes a body, a spin module on a lower side of the body, a pop-out module connected to the spin module, and a sensor which is distance sensor or a gyro sensor, the method comprising:

dividing a driving map into a plurality of cleaning areas based on one or more boundaries;

based on a boundary of the one or more boundaries being identified as a protruding portion, identifying a type of the protruding portion based on a cleaning progress for an area where the robot is located among the plurality of cleaning areas;

identifying a stuck state using the sensor; and when the stuck state is identified, controlling the pop-out module to protrude the spin module outside of the body.

* * * * *